Feb. 24, 1925.

H. A. BERLINER

HELICOPTER OR GYROCOPTER

Original Filed Jan. 23, 1920    2 Sheets-Sheet 1

1,527,666

Inventor
Henry A. Berliner

By Sturtevant & Mason
Attorneys

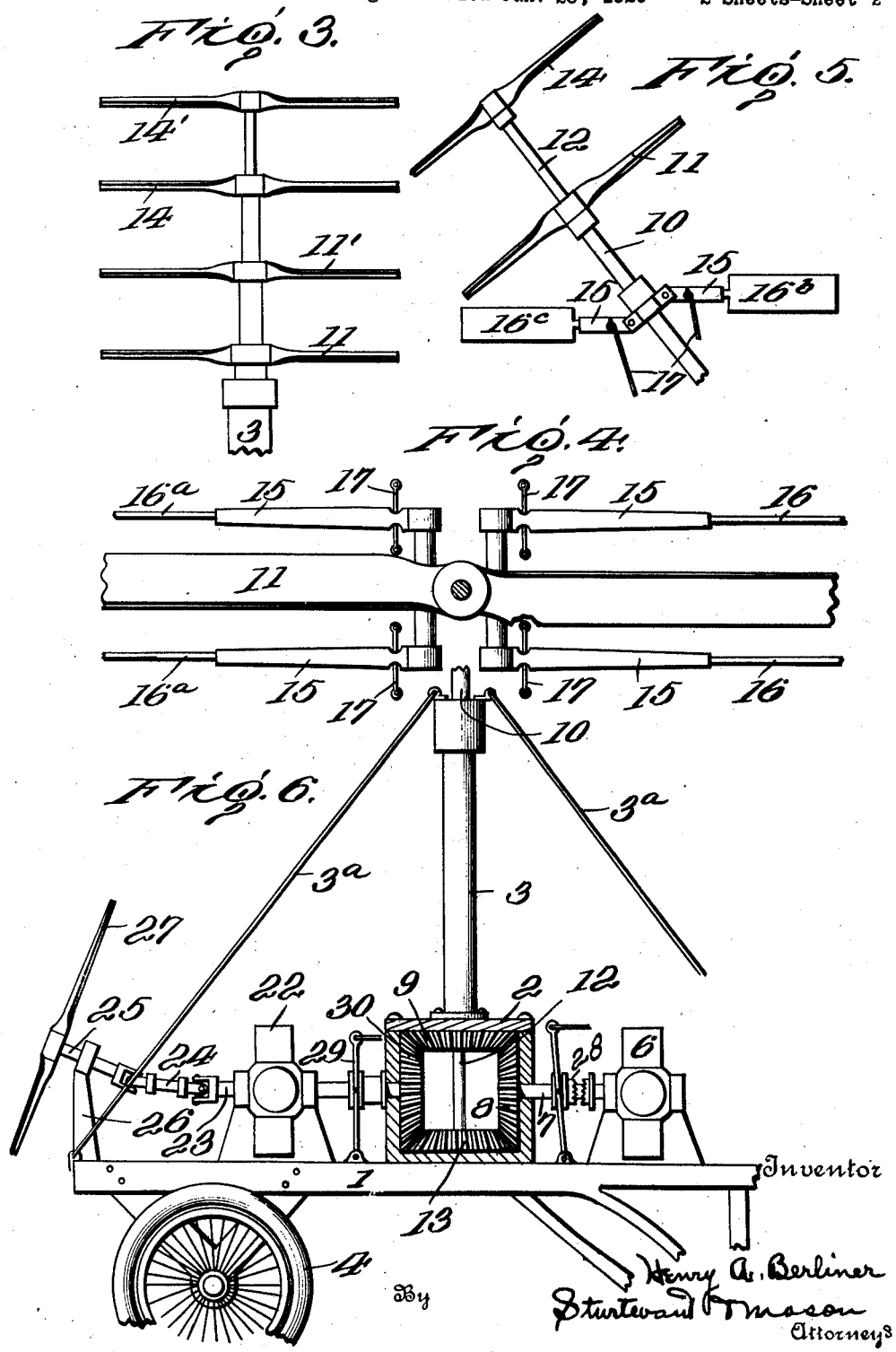

Patented Feb. 24, 1925.

1,527,666

UNITED STATES PATENT OFFICE.

HENRY A. BERLINER, OF WASHINGTON, DISTRICT OF COLUMBIA.

HELICOPTER OR GYROCOPTER.

Application filed January 23, 1920, Serial No. 353,428. Renewed June 27, 1922. Serial No. 571,281.

*To all whom it may concern:*

Be it known that I, HENRY A. BERLINER, a citizen of the United States, residing at Washington, in the District of Columbia, have invented certain new and useful Improvements in Helicopters or Gyrocopters, of which the following is a description, reference being had to the accompanying drawing, and to the figures of reference marked thereon.

The invention relates to new and useful improvements in helicopters or gyrocopters.

An object of the invention is to provide a helicopter having a rotating lifting means with one or more rudders which are disposed wholly or in part in the field of air pressure produced by the lifting means, and to provide said rudders with means whereby they may be independently or simultaneously manipulated so as to present a different angle to the air pressure for the purpose of steering the helicopter in its forward travel or for counterbalancing the torque of the propellers, or for simultaneously performing all of these functions.

Another purpose of the rudders is to provide for lateral control of the helicopter, that is, a tilting laterally for banking and for returning to a vertical plane. Furthermore, by changing the relative resistance of the rudders the axis of the propeller shaft may be shifted forward or backward.

Another object of the invention is to provide a helicopter with a plurality of lifting propellers, certain of which are disposed in the slip stream or draft of an advance propeller or propellers, and said propeller or propellers in the slip stream or draft are formed with different characteristics; that is, the blades differ in cross section or outline or have a different pitch so as to increase the thrust of the propellers operating in the slip stream or draft, and thereby increase the efficiency thereof to correspond with the efficiency of an advance propeller or propellers.

A further object of the invention is to provide a helicopter having rotating lifting means and a main power plant for operating the same, with an auxiliary independent power plant which may be utilized, if desired, for driving the helicopter forward but which is particularly adapted to be connected to the lifting means for operating the propellers temporarily in case the main power plant gives out, and thus insure the safe landing of the helicopter.

These and other objects will in part be obvious and will in part be hereinafter more fully disclosed.

In the drawings:—

Fig. 3 is a detail showing diagrammatically a helicopter having four propellers;

Fig. 4 is a view in plan showing a plurality of rudders and their arrangement relative to the central column and the propellers;

Fig. 5 is a slightly modified form showing means for changing the angle of the axes of the propellers relative to the vertical column containing the propeller shafts;

Fig. 6 is a view showing the lower portion of a helicopter with a modified form of arrangement of auxiliary motor.

Figures 1, 2:
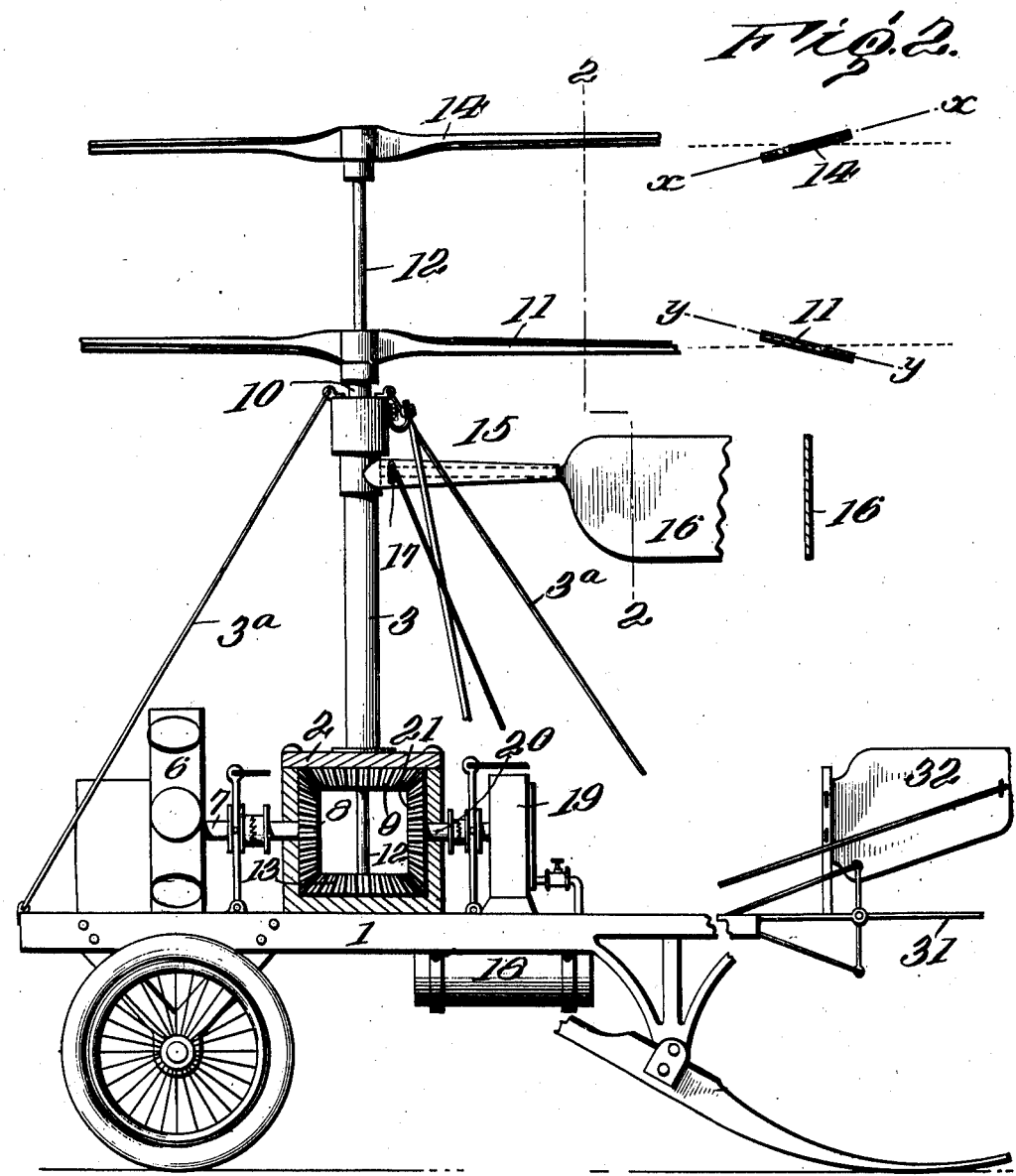
Figure 1 is a side view of a helicopter embodying my improvements.
Fig. 2 is sectional view on the line 2—2 of Fig. 1.

The invention is directed generally to a helicopter or gyrocopter having a suitable supporting means which is preferably in the form of a central column attached at its base to a frame or supporting platform and braced by suitable rods or wires. On the platform is a main power plant which is connected to the operating shafts located in the column for rotating the propellers. Also on the platform is an auxiliary power plant which may be in the form of a rotary turbine operated by compressed air, gas or other fluid stored in a pressure tank, or said auxiliary motor may be a gas motor and may be utilized for operating a propeller for driving the helicopter forward.

Carried by the column or other suitable supporting means beneath the lowermost propeller is one or more rudders, and these rudders are located in or partly in the field of air pressure produced by the rotation of the lifting propellers. Means is provided for independently turning these rudders so that they may be set at different angles of attack. It will be understood that the air pressure on the rudders will very greatly depend upon the thrust of the propellers and only in part upon the forward movement of the helicopter, and under certain conditions as to setting of the rudders the air pressure thereon will be wholly from the propellers. As a result, a slight shifting of the rudder or rudders will cause the helicopter to rotate, and thus may be used for steering the helicopter in its forward side travels. Also these rudders, which may be used for rotating the helicopter, may, at the same time be used to counterbalance the torque of the propellers. The rudders may also be used for banking and for tilting the axis of the propeller shaft forward and backward relative to the direction of flight.

As above noted, the two lifting propellers preferably rotate in opposite directions, and one is in advance of the other so that the under propeller rotates in the slip stream or draft of the advance propeller. The characteristics of the blade of the under propeller differ from those of the advance propeller. This may be brought about by changing the cross sectional shape of the blade, or the outline of the blade, or the pitch of the blade. Preferably the pitch of the blade of the under propeller is increased over the pitch of the blade of the advance propeller a sufficient extent so as to increase the thrust of the propeller operating in the slip stream or draft, whereby it becomes substantially equal to the thrust of the advance lifting propeller and thereby a maximum lifting power will be obtained from the use of the propellers. Furthermore, by this change in the characteristics of the propeller operating in the slip stream or draft, the torque of the two propellers, which is usually opposed one to the other, may be substantially balanced. Of course, the two propellers may rotate in the same direction with great efficiency, and the torque of the propellers may be balanced through the action of the rudders operating in the field of air pressure created by the propellers.

The invention will be possibly better understood by a detail reference to the drawings, wherein the helicopter is shown as consisting of a supporting platform 1 from which rises a framework 2 carrying a single vertical column or mast 3. This platform is mounted upon suitable supporting wheels 4. The column is braced by rods or wires 3ª which are connected to a suitable collar on the column and to the platform. On the platform is a main power plant consisting of a gas motor 6 which may be connected to a main shaft 7, and mounted on the main shaft 7 is a beveled gear wheel 8. Mounted in suitable bearings in the column or mast 3 is a shaft 10 carrying a gear wheel 9, and attached to the upper end of this shaft is a propeller 11. Also mounted in this column or mast 3 is a shaft 12 carrying a gear wheel 13 at its lower end and a propeller 14 at its upper end. The gear wheels 9 and 13 mesh with the gear wheel 8 and on the opposite sides of the axis of the main shaft so that these gear wheels 9 and 13 are rotated in opposite directions and thus the propellers are rotated in opposite directions.

In Fig. 3 there is a slightly modified form of arrangement wherein four propellers are used, which are indicated at 11—11' and 14—14'. These propellers are connected to vertical shafts which are so operated from the main power plant as to rotate the propellers 11—11' in one direction and the propellers 14—14' in the opposite direction. Various other arrangements of propellers may be used, as will be obvious to any one skilled in this art.

The invention from one aspect is directed to the construction of the propeller or propellers which are located so as to rotate in the slip stream or draft of an advance propeller or propellers. As above noted, the air conditions in which the propeller or propellers in the slip stream or draft operates are different. This, of course, changes the efficiency of the propeller working in the slip stream, provided it is of the same characteristics as the propeller operating in advance thereof. It is well understood that the thrust of a propeller may be varied by changing its speed, or by changing its diameter, or by setting the blades thereof at a different pitch, or by changing the design of the blade, that is, its cross sectional area or its outline. It is the purpose of the present invention, as noted above, to vary some one of these characteristics of the propeller working in the slip stream or draft so as to increase the thrust and bring the efficiency thereof up to that of the advance propeller, and thereby secure a maximum lifting power from the propellers. At the same time, this increasing of the thrust of the propeller or propellers working in the slip stream or draft will tend to counterbalance the torque of the two propellers if they are operated in opposite directions. It is preferred to bring about this increase of the thrust of the propeller working in the slip stream or draft by changing the pitch of the blade relative to the pitch of the blade of the advance propeller.

In Figs. 1 and 2 of the drawings, two propellers are shown which rotate in opposite directions, and in Fig. 2 the pitch of the propeller blade 14 is indicated by the line $x$—$x$ and the pitch of the propeller blade 11 is indicated by the line $y$—$y$. It will be noted that the inclination of the line $y$—$y$ to the horizontal is greater than the inclination of the line $x$—$x$. In other words, the propeller 11 has a greater pitch than the propeller 14. This pitch is determined with considerable accuracy so that one propeller will counterbalance the other as to torque, and so that the propeller working in the slip stream or draft will have an efficiency substantially equal to that of the advance propeller. While I have preferred to change the pitch of the propellers, it will be understood that this increase of the efficiency or the counterbalancing of the propellers may be brought about by changing any of the characteristics of the propellers referred to above. The principle may also be applied to the arrangement shown in Fig. 3 where four propellers are used. It will be understood, therefore, that in the detailed illustration above referred to the expression "two propellers" is purely for the purpose of description and not as a limitation of the scope of the invention.

Mounted on the column 3 is a supporting bracket 15 on which is mounted, as shown in Fig. 1, a rudder 16. This rudder 16 may be rotated about its longitudinal axis by suitable means controlled by the operator and indicated in a general way at 17. In Fig. 4 of the drawings, I have shown an arrangement wherein four rudders are used, two being in advance, and two in rear of the column 3. These rudders are indicated at 16—16 and 16ᵃ—16ᵃ. The axis of each rudder is parallel with the plane of movement of the propellers, and these rudders may be independently operated or simultaneously operated through the operating means indicated at 17. It will be noted that the rudder extends slightly above the longitudinal pivotal axis thereof, and in a measure this balances the rudder so that the air pressure thereon does not put great strain upon the operating means.

The rudders may be set at any desired angle to the slip stream or draft and, as shown in Figs. 1 and 4, these rudders are wholly within the field of air pressure produced by the propellers. These rudders may, if desired, be set so as to only be partially within the field of air pressure. With the rudders set so as to move about a longitudinal axis at right angles to the longitudinal axis of the mast or column, said rudders would in part be influenced by the air pressure due to the forward travel of the helicopter.

In Fig. 5 of the drawings, I have shown an arrangement wherein the rudders, indicated at 16ᵇ and 16ᶜ are mounted so that their longitudinal axes may be kept substantially parallel with the sidewise movement of the helicopter. These rudders may be turned about their longitudinal axes in the manner described in connection with Figs. 1 and 4. By this setting of the rudders, as shown in Fig. 5, air pressure due to the side travel of the helicopter will have little or no effect upon the rudders, said rudders being subjected almost wholly to the air pressure of the propellers. Suitable means may be provided for changing the angles of the longitudinal axes of the rudders to the longitudinal axis of the column, if desired.

If the torque of the propellers is not balanced one by the other, these rudders may be used for counterbalancing the torque. If the propeller rudders rotate in the same direction, then again the rudders may be used for counterbalancing the torque incident to the rotation of the propeller. The rudders may also be used for guiding the direction of the helicopter in its forward travel. It is particularly noted that the air pressure on the rudders which tends to turn the helicopter and thus enables the helicopter to be guided and the torque to be counterbalanced is not due to the forward travel of the helicopter to any extent but the air pressure created by the lifting propellers, and this greatly increases the efficiency of the rudders even though the helicopter may be traveling bodily upwardly or forward comparatively slowly. Then again, as above noted, the rudders may be shifted for lateral control of the helicopter for tilting the axis thereof to one side or the other of the forward vertical plane of travel for banking and for returning the propeller axis to said plane. Then again, by setting the rudders so as to vary the resistance of the forward rudders relative to the resistance of the rearward rudders, the shifting of the vertical axis of the propeller shaft forwardly and backwardly in the direction of flight may be accomplished and thus the direction of flight controlled. It will be noted that the rudders are so disposed relative to the axis of the lifting means so that during lateral control, the torque incident to one rudder is counterbalanced by the rotating torque incident to the other rudder, and thus the axis of the helicopter may be tilted fore and aft or laterally without causing the helicopter to rotate about the axis of the propeller shaft.

Mounted on the supporting platform 1 is a reservoir 18 and a motor 19. The reservoir is adapted to receive air, gas or any operating fluid which may be stored therein under pressure, and this air, gas or liquid under pressure is utilized for actuating the motor 19. The motor 19 may be connected by a suitable shifting clutch to a shaft 20 attached to a gear 21 which is in mesh with the gears 9 and 13. If the main power plant breaks down for any reason, it may be readily disconnected from the gear 8 and the auxiliary motor 19, which may be run continuously or set into operation at will, connected to the gear 21 and thus utilized for operating the lifting propellers. This serves as an emergency power plant which may be brought into use when the main power plant gives out so as to insure a safe landing of the helicopter.

In Fig. 6 of the drawings, I have shown a slightly modified arrangement of auxiliary motor. In this figure, the main motor is indicated at 6 and is of the construction described in connection with Fig. 1. The auxiliary motor is indicated at 22 and is also of the gasoline type. This auxiliary motor operates primarily a shaft 23 which is connected through a shaft 24 with a shaft 25 mounted in a suitable bracket 26, and on the shaft 25 is a propeller 27 to be used in the propelling of the helicopter in a sidewise direction. Between the main motor 6 and the shafts carrying the propellers is a clutch 28 which may be thrown out. The auxiliary motor 22 may be connected by means of a clutch 29 with a gear 30 which is in mesh with the gears 9 and 13. This auxiliary motor may be used after the manner of the motor 19. If the main motor 6 gives out for any reason, then it may be disconnected and the auxiliary motor 22 connected onto the main propellers for insuring a proper landing of the helicopter. If desired, the propeller 27 may be disconnected during the use of the auxiliary motor for actuating the lifting propellers.

It will be understood that the helicopter may be provided with a suitable rudder and elevator, such as used in connection with aeroplanes if found desirable. In Fig. 1 of the drawings, there is shown more or less diagrammatically an elevator 31 which may be controlled by the aviator and a rudder 32. Through the use of this elevator and the rudder the helicopter may be directed in its forward movement. Attention is particularly called to the fact that the propellers and the rudders are all carried by a central column or mast properly braced by rods and wires, and thus all outer frame parts are done away with, greatly decreasing the weight of the machine.

It is obvious that many changes in the details of construction and the arrangement of the parts may be made and that the present illustration and description is solely for the purpose of disclosing one embodiment of the basic principles of the invention set forth in the appended claims.

Having thus described the invention, what I claim as new and desire to secure by Letters-Patent is:—

1. A helicopter including in combination a support, a power plant carried thereby, rotating telescoping shafts carried by the support and connected to the power plant, whereby said shafts are rotated in opposite directions, a propeller carried by each shaft, a plurality of rudders located in the field of air pressure produced by the propellers, and means for positioning the rudders for lateral control of the helicopter, said rudders being so disposed about the axis of the rotating lifting means that the rotating torque incident to one rudder is counterbalanced by the rotating torque incident to the other rudder during such lateral control.

2. A helicopter including in combination a support, a power plant carried thereby, rotating telescoping shafts carried by the support and connected to the power plant whereby said shafts are rotated in opposite directions, a propeller carried by each shaft, a plurality of rudders located in the field of air pressure produced by the propellers, and means whereby said rudders may be independently turned or positioned for lateral control of the helicopter, said rudders being so disposed relative to the axis of the shafts carrying the propellers that by tilting the rudders, the helicopter may be caused to tilt laterally and during said lateral control of the helicopter, the rotating torque incident to one rudder is counterbalanced by the rotating torque incident to the other rudder.

3. A helicopter including in combination a support, a power plant carried thereby, rotating telescoping shafts carried by the support and connected to the power plant whereby said shafts are rotated in opposite directions, a propeller carried by each shaft, a plurality of pairs of rudders, one pair being located in front and the other in rear of the axis of the shafts carrying the propellers, and means for independently controlling said rudders whereby said rudders may be set so that the helicopter may be caused to tilt fore and aft for causing the same to travel bodily forward or tilted to one side or the other for banking in turning, and whereby the rotating torque incident to certain of the rudders may be balanced by the rotating torque of the other rudders.

4. A helicopter including in combination a power plant, lifting propellers rotating in opposite directions, one in advance of the other, said propeller in the slip stream or draft having characteristics differing from the propeller in advance thereof whereby the rotating torque incident to the propellers is counterbalanced, rudders disposed beneath the propellers and in the field of air pressure created thereby, means for positioning said rudders so that the axis of the propellers may be shifted at different angles relative to the vertical, said rudders being so disposed relative to the axis of rotation of the propellers that the rotating torque incident to said rudders is counterbalanced whereby the axis of the helicopter may be shifted without causing said helicopter to rotate about the axis of the propellers.

5. A helicopter including in combination a power plant, oppositely rotating lifting propellers, one being located in advance of the other, the propeller disposed in the slip stream or draft of the advance propeller having its blades disposed at a pitch differing from the pitch of the advance propeller whereby the rotating torque incident to the propellers is counterbalanced one by the other, rudders located beneath the propellers and in the field of air pressure created by said propellers, means for independently positioning said rudders, said rudders being disposed substantially at opposite sides of the axis of rotation of the propellers whereby said rudders may be set so as to shift the angle of the axis of rotation of the propellers relative to the vertical and without causing said helicopter to rotate about the axis of the propellers.

6. A helicopter including in combination, a main support, a main power plant mounted thereon, a central column or mast, bracing rods connected to the upper end of the column or mast and to the support, shafts extending through said central column or mast and mounted in bearings therein, gears at the lower end of the column for actuating said shaft, means for operating said gears from said power plant, propellers carried by said shafts, and rudders carried by said column or mast, said rudders being arranged in pairs, one pair being in front and the other in rear of the column whereby said rudders may be set so as to cause the central column to tilt forward or aft for causing the helicopter to travel bodily forward or to one side or the other for banking in turning, so that the rotating torque incident to certain of the rudders may be balanced by the rotating torque incident to the other rudders.

In testimony whereof, I affix my signature.

HENRY A. BERLINER.